United States Patent
Reddy

[15] 3,679,244
[45] July 25, 1972

[54] RELEASABLE SHAFT LOCK

[72] Inventor: Robert R. Reddy, 1195 Michillinda Blvd., Pasadena, Calif. 91107

[22] Filed: Sept. 21, 1970

[21] Appl. No.: 73,865

[52] U.S. Cl. ..............................287/20 R, 287/103, 151/69
[51] Int. Cl. ...........................................................F16b 9/00
[58] Field of Search ...............287/DIG. 7, 20, 103 A; 85/88; 24/221 R, 230 TC, 201 S, 230 NP; 151/69

[56] References Cited

UNITED STATES PATENTS

| | | | |
|---|---|---|---|
| 3,391,954 | 7/1968 | Callahan | 85/8.8 X |
| 1,485,990 | 3/1924 | Moore | 24/221 R |

Primary Examiner—Andrew V. Kundrat
Attorney—Angus & Mon

[57] ABSTRACT

Releasable means for locking a shaft in an opening in a body, which opening is bounded by a peripheral, usually cylindrical, wall. A recess is formed in the wall and bounded at least in part by a circumferentially extending ramp-like bottom surface that extends for less than the full periphery of the wall, and a catch surface adjacent to the bottom surface. The catch surface extends radially. In the wall of the shaft there is provided a locking member which is resiliently biased to extend beyond its periphery and which can be retracted entirely within the periphery of the shaft. The lock member is restrained against rotation relative to the shaft so that when the shaft is pressed into the hole, the lock member can snap outwardly into the recess, thereby to lock the shaft in place, but the shaft can be released by twisting it so that the lock member is cammed inwardly to the diameter of the wall in which the recess is formed, and the shaft can thereafter be withdrawn.

6 Claims, 19 Drawing Figures

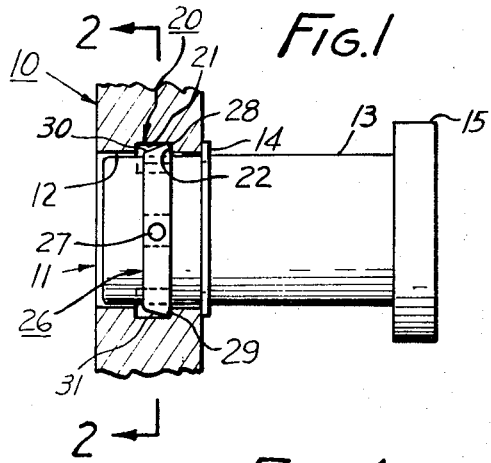
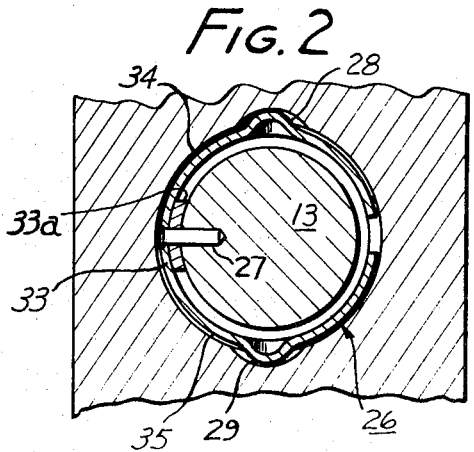
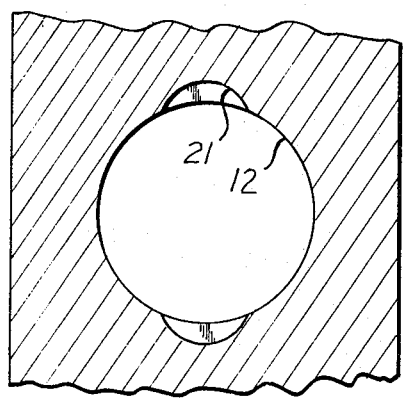
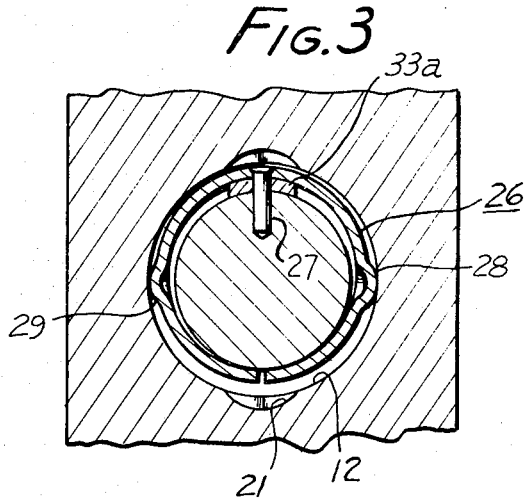
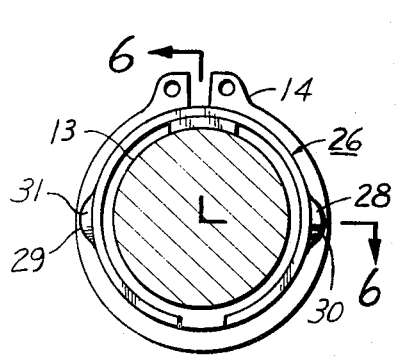
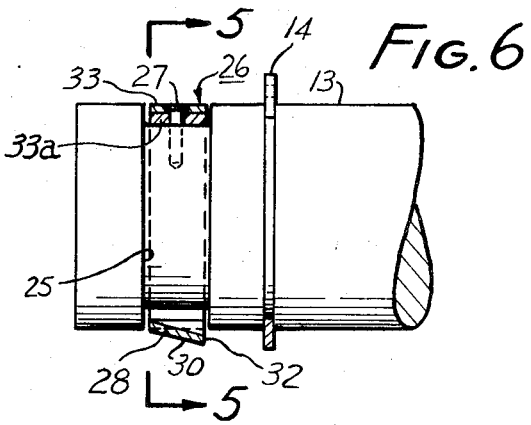

INVENTOR.
ROBERT R. REDDY

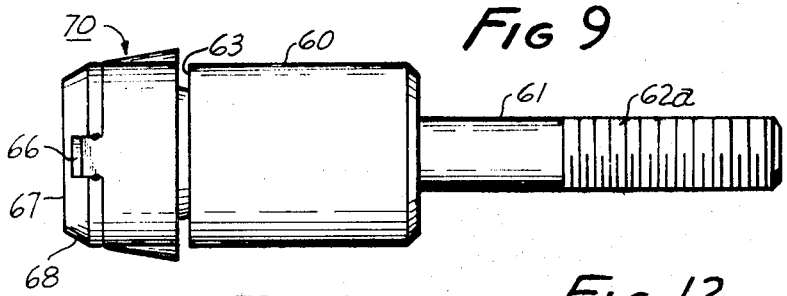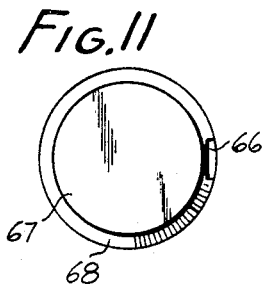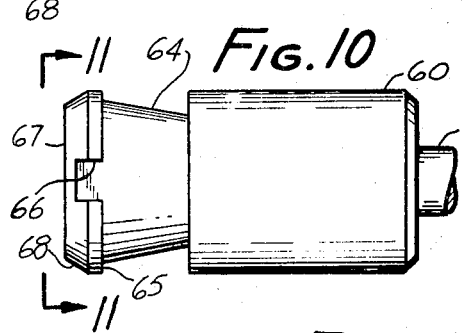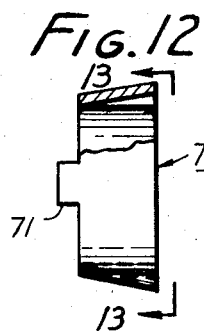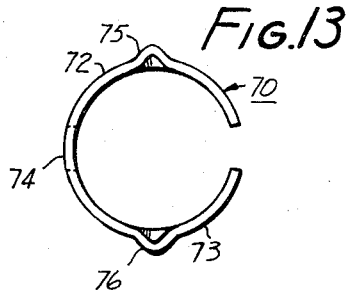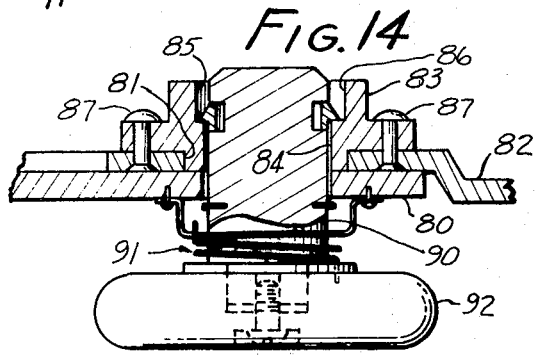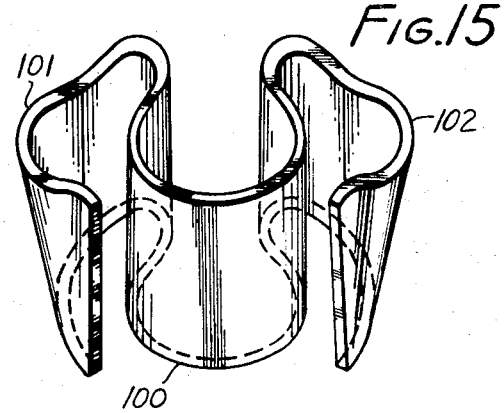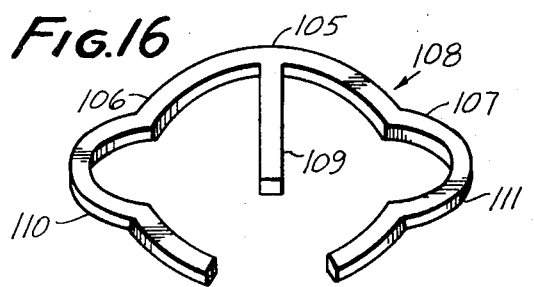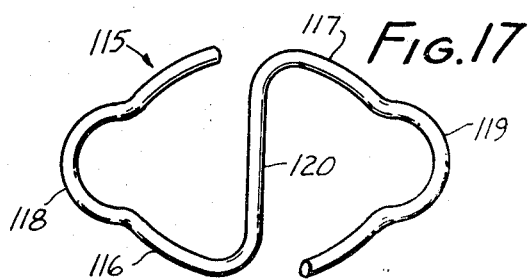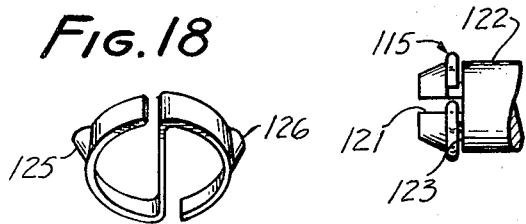

RELEASABLE SHAFT LOCK

This invention relates to releasable means for locking a shaft in an opening in a body.

There are numerous requirements, such as for latch members, wherein it is desired to press an object such as a shaft into an opening in a body where it will be held against axial removal, but in which it can be released by turning the shaft and then pulling it loose. It is an object of this invention to provide an elegantly simple device of this nature.

Release means according to this invention includes a recess formed in a peripheral, usually cylindrical, wall of the body which is bounded at least in part by a ramp-like bottom surface that extends for less than the full periphery of the wall, and a catch surface adjacent to the bottom surface which extends radially. A recess is provided in the shaft, and a lock member is placed therein which is biased to move beyond the outer wall of the shaft or by radial force to be compressed within the envelope of the shaft. The locking engagement is provided by forcing the shaft into the opening so that the lock member snaps into the recess and engages a wall thereof to prevent removal. Removal is accomplished by turning the shaft, the lock member then riding up the ramp-like bottom surface so as to clear the catch surface, and the shaft can then be withdrawn.

According to a preferred but optional feature of the invention, the lock member comprises a resilient ring, in the relaxed condition of which, ears on the ring project beyond the wall of the shaft. In the compressed condition, the ring is retracted into the ring groove.

The above and other features of this invention will be fully understood from the following detailed description and the accompanying drawings in which:

FIG. 1 is a side elevation partly in axial cross-section showing an embodiment of the invention installed in its locked condition;

FIG. 2 is a cross-section taken at line 2—2 of FIG. 1;

FIG. 3 is a view taken as in FIG. 2, but with the shaft rotated 90° from its position in FIG. 2;

FIG. 4 is a cross-section of a part of FIG. 1, taken at line 2—2;

FIG. 5 is a cross-section taken at line 5—5 of FIG. 6;

FIG. 6 is a section taken at section line 6—6 of FIG. 5;

FIG. 9 is a side view of the shaft portion of the presently preferred embodiment of the invention;

FIG. 10 is a side view of a portion of FIG. 9;

FIG. 11 is an end view taken at line 11—11 of FIG. 10;

FIG. 12 is a side view partly in cutaway cross-section of another portion of FIG. 9;

FIG. 13 is an end view taken at line 13—13 of FIG. 12;

FIG. 14 is a view principally in axial cross-section of another embodiment of the invention;

FIGS. 15–18 are perspective views of various alternative types of lock members useful in this invention; and FIG. 19 is a side elevation of a shaft incorporating the lock member of FIG. 17.

Figure 7:
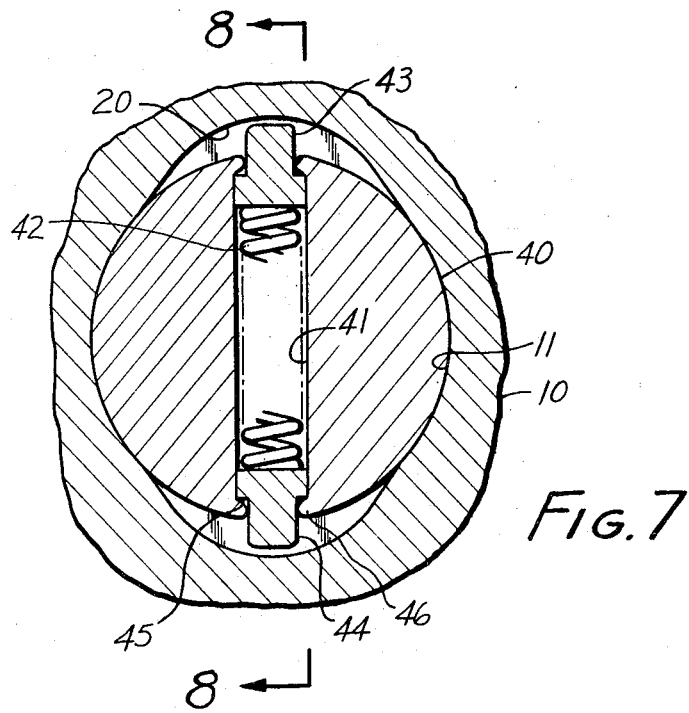
FIG. 7 is a transverse cross-section of another embodiment of the invention.
Figure 8:
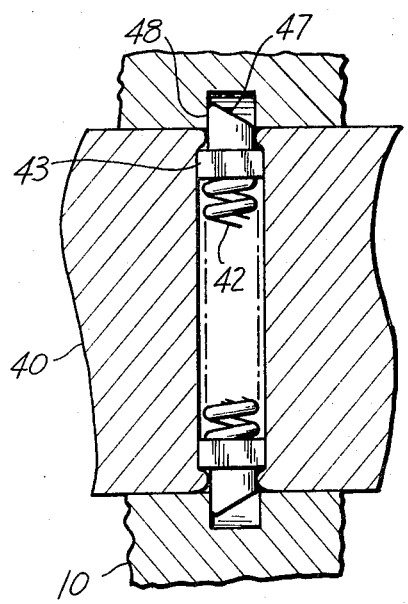
FIG. 8 is a cross-section taken at line 8—8 of FIG. 7.

In FIG. 1 there is shown a body 10 with an opening 11 defined by a peripheral, in this case cylindrical, wall 12 in which a shaft 13 is to be held. Depth of penetration of the shaft is limited by a snap ring 14 (FIGS. 1 and 6) or some other type of collar attached to or formed as a part of the shaft. A head 15 is shown on the shaft which is exemplary of some desired device to be supported by the shaft, for example a handle.

A recess 20 is formed inside cylindrical wall 12. This is bounded at least in part by a ramp-like bottom surface 21 and a catch surface 22. The recess can readily be formed by offsetting a cylindrical milling cutter in wall 12. The catch surface is adjacent to the bottom surface, extends radially, and is intended to prevent a lock member from being pulled out of the hole. The ramplike bottom surface extends circumferentially, decreases in depth from end to end along a transverse section (Its depth along any plane that includes the axis is constant. Its angular subtense is less than the full periphery of the wall, and all of its edges intersect the cylindrical wall.

A ring groove 25 is formed on the external surface of the shaft. Within the groove there is attached a lock member 26, in this case a resilient ring. The depth of the groove is such that the lock member can be pressed into the envelope of the shaft; that is, the lock member can be pressed into the groove so that it does not project beyond the shaft diameter. A pin 27 attaches the lock member to the base of the ring groove and prevents the lock member from rotating relative to the shaft. The lock member has a pair of ears 28, 29, each of which has a respective tapered surface 30, 31 to facilitate entry of the device and compression of the lock member into the envelope. A bearing face 32 on the lock member faces toward the head end of the shaft and is adapted to bear against catch surface 22. As can best be seen in FIG. 2, wherein the lock member is shown in its relaxed condition, the lock member has a bight 33 and a pair of arms 34, 35 which embrace the shaft. A spacer 33a spaces the bight from the base of the groove. The ears extend beyond the outer periphery or envelope of the shaft to perform the locking action when the lock member is in its relaxed condition. When the shaft is inserted into the opening, the condition of FIG. 3 will occur wherein the ears are pressed into the opening, and this permits the insertion of the shaft to the design depth. FIG. 3 also indicates the removal position.

In order to lock the device as shown in FIG. 3, it is necessary to rotate the shaft 90° from the position relative to the body shown in FIG. 3 so that the ears can move outwardly into the recesses to the condition of FIG. 2. However, it will be a usual arrangement for the shaft to be pressed into the locking condition with the ears already axially aligned as in FIG. 2, the alignment being maintained by a rotary spring return mechanism, and then later and temporarily to turn the shaft to the position of FIG. 3 for removal. The device would thereby be biased to its locked position.

The ears on the lock member are readily formed by a die-forming operation. The ring will be shaped such as by rolling to its relaxed configuration, and then the arms will be placed in a die and stamped to create the ears. There is no substantial deformation of the ears during the installation and removal operations, the ring material not appreciably straightening out or elongating. Instead, the device functions principally by flexing action in the bight.

Another embodiment of the invention is shown in FIG. 7 wherein body 10 with its recesses is shown. The same numerals are used for the same parts. However, in this case, a pin 40 has been modified so as to provide a diametral bore 41 within which a spring 42 is placed in opposition to two lock members 43, 44, which are plungers with shoulders 45 that retain the plungers by opposition to peened-in shoulders 46.

The lock members include a tapered face 47 and a bearing face 48 as in FIG. 3. The function of this device is precisely the same as that of FIG. 1 except that the resilient action resulting in the retraction of the lock members within the envelope of the shaft is caused by direct radial retraction in a sliding motion against a spring rather than as a consequence of a bending motion as in FIG. 1. The concepts of the devices are completely analagous, and their uses will be obvious from a comparison of the two sets of figures.

The presently-preferred embodiment of the invention is shown in FIGS. 9–13. A shaft 60 with a stem 61 adapted by threads 62a or otherwise to receive a handle, includes a peripheral ring groove 63. The base 64 of the ring groove is tapered for reasons yet to be disclosed. One shoulder 65 of the groove bears a notch 66. The nose end 67 of the shaft has a chamfer 68 to facilitate insertion of the shaft in a hole.

A lock member 70 (FIGS. 12 and 13) includes a tang 71 which fits into notch 66. It may be peened into it to make a retentive fit, and this will prevent both floating and rotation of the lock member relative to the shaft.

The lock member includes a pair of arms 72, 73 and a bight 74. Ears 75, 76 are die-formed on respective arms. The angulation of the base 64 provides for reception of these ears. Alternatively, the bottom of the ring groove could be cylindrical as in FIG. 1.

It will be seen that the function of shaft 60 with lock member 70 is identical to that of shaft 13 in FIG. 1, and that it can be used with body 10 in place of shaft 13.

FIG. 14 shows a modification which is useful as a door latch. A cover plate 80 is adapted to close a port 81 in a structure 82. A body 83, provided with a cylindrical wall 84 and a pair of recesses 85 and 86 identical with those in FIG. 1 is mounted by fasteners 87 to structure 82.

A shaft 90 identical to shaft 13 of FIG. 1 is rotatably mounted to cover plate 80. Return spring mechanism 91 rotatably biases the shaft to the locked position shown in FIG. 14. Handle 92 is mounted to the shaft so it can be turned. Its operation is identical to that of the foregoing embodiments.

Instead of pinning the lock member to the shaft, or of inserting a tang into a notch, the shaft can be slotted or otherwise modified to receive a portion of the lock member, whereby to prevent floating and rotation relative to the shaft. Utilizing optional means for this purpose enables somewhat simpler lock members to be used.

In FIG. 15, for example, a sheet metal device is shown. However, even powder metallurgy could be used to make this device. Instead of a bight, a re-entrant bulb 100 is formed which can be fitted in a matching recess in a shaft to prevent floating and relative rotation. Two slanted ears 101, 102 are provided as in the other embodiments.

In FIG. 16, a bight 105 and two ears 106, 107 are provided on a lock member 108 which includes an inwardly-directed tang 109, which tang prevents floating and rotation. Two ears 110 and 111 are provided. The structure is flat-sided. The tang may be fitted into a hole in the side of the shaft.

FIG. 17 illustrates that the lock member may have curved as well as flat side surfaces, provided that they meet the edge of the recesses so they will not self-cam out of them. This lock member 115 is serpentine, having two arms 116, 117, each with an ear 118, 119, and a central reach 120 which will fit in a slot 121 (FIG. 19) in a shaft 122, the arms fitting in a groove 123 as in the other embodiments.

In FIG. 17, the lock member is made from round wire. In FIG. 18 it is made from flat strip. The lock member of FIG. 18 may be directly substituted for that of FIG. 17. It differs from it in that its ears 125, 126 are stamped instead of being formed by bending.

This invention thereby provides a convenient latch or lock means for restraining a shaft against axial removal but permitting ready removal by turning the shaft.

The invention is not to be limited by the embodiments shown in the drawings and described in the description which are given by way of example and not of limitation, but only in accordance with the scope of the appended claims.

I claim:

1. Releasable means for locking a shaft in an opening in a body, which opening is bounded by a peripheral wall, comprising a plurality of angularly spaced-apart recesses in said wall bounded at least in part by a circumferentially extending ramp-like bottom surface, each recess extending for less than 180° of the wall's periphery, and a catch surface adjacent to the bottom surface of each recess and extending radially, a peripheral groove in said shaft, a lock member in said groove having a pair of arms embracing the shaft and proportioned so as to be compressed by external forces entirely into the said groove, said lock member being rotatably restrained to the shaft, an ear on each arm projecting radially outward therefrom, said ears constituting the only substantial radial projection of the lock member beyond the radius of the shaft, and each ear having a planar bearing face adapted to bear against the catch surface when the ear projects into a respective recess, a cam surface adapted to bear against and ride along the bottom surface of the recess when the shaft is turned, and a tapered lead-in surface adapted to engage the body when the shaft is pressed into the opening so as to retract the ears and the remainder of the lock member into the peripheral groove, whereby the shaft may be locked to the body by moving the shaft into the opening with the ears aligned with the recesses and be released by turning the shaft to cam the ears out of the recesses so that the bearing faces clear the catch surfaces.

2. Releasable means according to claim 1 in which a collar is provided on the shaft to limit the depth of insertion of the shaft into the opening.

3. Releasable means according to claim 1 in which the shaft includes a recess, and the lock member includes a portion fitted into said recess to prevent relative rotation of the lock member and the shaft.

4. Releasable means according to claim 3 in which said portion comprise a tang.

5. Releasable means according to claim 3 in which said portion comprises the central member of a serpentine array.

6. Releasable means according to claim 1 in which the shaft is provided with resilient means which biases it toward the locked position.

* * * * *